US009600057B2

(12) United States Patent
Seto

(10) Patent No.: US 9,600,057 B2
(45) Date of Patent: Mar. 21, 2017

(54) INFORMATION PROCESSING APPARATUS, INFORMATION PROCESSING SYSTEM, AND METHOD FOR CONTROLLING THE SAME

(71) Applicant: CANON KABUSHIKI KAISHA, Tokyo (JP)

(72) Inventor: Hidekazu Seto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 334 days.

(21) Appl. No.: 13/923,448

(22) Filed: Jun. 21, 2013

(65) Prior Publication Data

US 2014/0006827 A1    Jan. 2, 2014

(30) Foreign Application Priority Data

Jun. 28, 2012    (JP) .................. 2012-146084

(51) Int. Cl.
*G06F 1/26*    (2006.01)
*G06F 1/32*    (2006.01)

(52) U.S. Cl.
CPC .......... *G06F 1/3234* (2013.01); *G06F 1/3284* (2013.01); *G06F 1/3203* (2013.01); *Y02B 60/1267* (2013.01); *Y02B 60/50* (2013.01)

(58) Field of Classification Search
CPC .................................................. G06F 1/3234
USPC ...................................................... 713/323
See application file for complete search history.

(56) References Cited

U.S. PATENT DOCUMENTS

| 6,379,058 B1* | 4/2002 | Petteruti | B41J 3/36 400/61 |
| 6,806,976 B1* | 10/2004 | Suyehira | G06F 21/608 358/1.13 |
| 7,912,442 B2* | 3/2011 | Rotzoll | H04W 52/0229 455/343.2 |
| 2003/0025939 A1* | 2/2003 | Jeran | G06K 15/00 358/1.16 |
| 2005/0066208 A1* | 3/2005 | Koie | B41J 29/393 713/320 |

(Continued)

FOREIGN PATENT DOCUMENTS

JP    2009-104207 A    5/2009

*Primary Examiner* — Thomas Lee
*Assistant Examiner* — Volvick Derose
(74) *Attorney, Agent, or Firm* — Rossi, Kimms & McDowell LLP

(57) ABSTRACT

An information processing apparatus of one aspect of the present invention, upon receipt of a sleep return command from an information terminal via a wireless tag that receives a radio signal output from the information terminal and performs short-range wireless communication with the information terminal, switches the power mode of the information processing apparatus from the power-saving mode to a normal mode and notifies the information terminal that the information processing apparatus has been switched to the normal mode. After performing this notification, the information processing apparatus performs authentication of a user upon receipt of authentication data of the user from the information terminal, and starts an operation in the normal mode if the authentication of the user has succeeded, and shifts the power mode to the power-saving mode if the authentication of the user has not succeed.

8 Claims, 12 Drawing Sheets

(56) References Cited

U.S. PATENT DOCUMENTS

| | | | |
|---|---|---|---|
| 2006/0022802 A1* | 2/2006 | Bridgelall | G06K 19/0707 340/10.33 |
| 2006/0029412 A1* | 2/2006 | Kato | G03G 15/5004 399/80 |
| 2007/0132592 A1* | 6/2007 | Stewart | G06K 19/0723 340/572.8 |
| 2007/0184816 A1* | 8/2007 | Horisawa | H04L 63/0492 455/411 |
| 2007/0260337 A1* | 11/2007 | Sugiyama | G06F 1/32 700/40 |
| 2008/0067249 A1* | 3/2008 | Nakatsugawa | G06Q 20/32 235/451 |
| 2008/0137862 A1* | 6/2008 | Morita | G06K 7/10237 380/270 |
| 2008/0186524 A1* | 8/2008 | Morimoto | G03G 15/5004 358/1.13 |
| 2009/0221240 A1* | 9/2009 | Zhang | G06K 7/0008 455/68 |
| 2009/0228695 A1* | 9/2009 | Pathak | G06F 1/3203 713/1 |
| 2010/0049987 A1* | 2/2010 | Ettorre | G06F 21/32 713/186 |
| 2010/0187308 A1* | 7/2010 | Busch-Sorensen | G06K 7/10237 235/439 |
| 2010/0188698 A1* | 7/2010 | Koizumi | G03G 15/5004 358/1.15 |
| 2011/0174874 A1* | 7/2011 | Poznansky | G06K 19/12 235/379 |
| 2011/0246757 A1* | 10/2011 | Prakash | G06F 21/305 713/2 |
| 2012/0026996 A1* | 2/2012 | Yamaguchi | H04B 1/406 370/338 |
| 2012/0155349 A1* | 6/2012 | Bajic | H04W 4/008 370/311 |
| 2012/0210148 A1* | 8/2012 | Choi | G06F 1/3203 713/310 |
| 2012/0250068 A1* | 10/2012 | Yamamoto | G06F 21/608 358/1.14 |
| 2012/0278636 A1* | 11/2012 | Lin | H04L 12/12 713/300 |
| 2013/0339758 A1* | 12/2013 | Lake | G06F 1/22 713/300 |

* cited by examiner

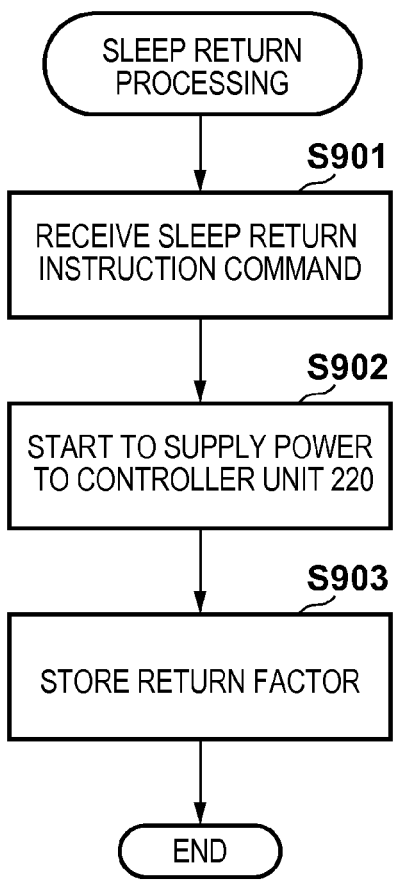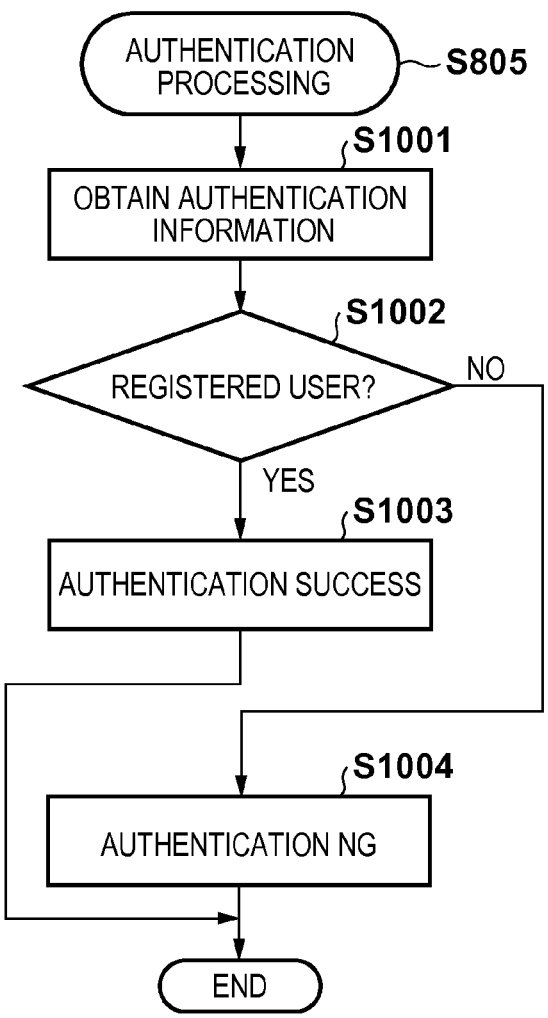

FIG. 11

| USER ID | PASSWORD |
|---------|----------|
| AAA | DVT&Sg0l |
| BBB | 6mWRnC3r |
| CCC | 09bPMafq |

FIG. 12A

| DEVICE ID | USER ID |
|-----------|---------|
| XXX | AAA |
| XXX | BBB |
| XXX | CCC |
| ZZZ | AAA |
| ZZZ | CCC |

FIG. 12B

| USER ID | PASSWORD |
|---------|----------|
| AAA | DVT&Sg0l |
| BBB | 6mWRnC3r |
| CCC | 09bPMafq |

INFORMATION PROCESSING APPARATUS, INFORMATION PROCESSING SYSTEM, AND METHOD FOR CONTROLLING THE SAME

BACKGROUND OF THE INVENTION

Field of the Invention

The present invention relates to an information processing apparatus, an information processing system, and a method for controlling the same.

Description of the Related Art

Conventionally, multi-function peripherals and the like have been provided with authentication functions for controlling whether or not a user can use the multi-function peripherals and the like. An authentication method utilizing an RFID tag is one such authentication function. This authentication method involves a multi-function peripheral provided with a tag reader/writer contactlessly reading authentication information from an RFID tag that has been brought in close proximity, and authenticating this RFID tag using the read authentication information.

Further, in using of this authentication method, a technique for changing a point to return from a power-saving mode to a normal mode depending on authentication contents has been proposed (Japanese Patent Laid-Open No. 2009-104207). For example, if a user who is only permitted to use scanning is authenticated, only a scanning unit is turned on so as to return from the power-saving mode.

Meanwhile, in recent years, the number of information terminals such as smartphones and tablet PCs that are capable of performing communication by NFC, which is one of contactless wireless communication means, has increased. These information terminals each include an integrated tag reader/writer, and can read and write data from and to an RFID card using this integrated tag reader/writer.

These information terminals can therefore performs contactless wireless communication with apparatuses provided with an RFID tag. For example, by providing a multi-function peripheral with an RFID tag in which information unique to this multi-function peripheral is described, it is possible for an information terminal that is brought close to this multi-function peripheral to obtain, for example, the information unique to this multi-function peripheral.

The conventional authentication method by holding an RFID tag over a tag reader/writer is convenient for users, but in order to detect that the RFID tag has approached close by, the multi-function peripheral needs to continue to supply power to an RFID tag reader/writer also during the power-saving mode. Therefore, even during the power-saving mode, the RFID tag reader/writer consumes power, resulting in an increase in the power consumption in the power-saving mode.

SUMMARY OF THE INVENTION

The present invention has been made to solve the problems with above-mentioned conventional technology. A feature of the present invention is to provide a technology in which simply by bringing an information terminal close to an information processing apparatus in a power-saving mode in which power consumption is low, it is possible to cause the information processing apparatus to return from the power-saving mode to a normal mode, and a technology for reducing power consumption in the power-saving mode.

According to one aspect of the present invention, there is provided an information processing apparatus comprising: a wireless tag configured to be supplied with power based on a radio signal transmitted from an information terminal; a power mode control unit configured to shift the information processing apparatus from a power-saving mode to a normal mode upon receipt of a sleep return command from the information terminal via the wireless tag; a notification unit configured to notify the information terminal that the information processing apparatus has been shifted to the normal mode by the power mode control unit; an authentication unit configured to perform authentication of a user upon receipt of authentication data of the user from the information terminal after the notification by the notification unit; and a control unit configured to start an operation in the normal mode if the authentication of the user by the authentication unit has succeeded, and to control the information processing apparatus to shift to the power-saving mode if the authentication of the user by the authentication unit has not succeed.

According to another aspect of the present invention, there is provided an information processing system comprising an information processing apparatus and an information terminal, the information processing apparatus including: a wireless tag configured to be supplied with power based on a radio signal transmitted from an information terminal; a power mode control unit configured to shift the information processing apparatus from a power-saving mode to a normal mode upon receipt of a sleep return command from the information terminal via the wireless tag by short-range wireless communication; a notification unit configured to notify the information terminal that the information processing apparatus is shifted to the normal mode by the power mode control unit; an authentication unit configured to perform authentication of a user upon receipt of authentication data of the user from the information terminal after notification by the notification unit; and a control unit configured to start an operation in the normal mode if the authentication of the user by the authentication unit has succeeded, and to control the information processing apparatus to shift to the power-saving mode if the authentication of the user by the authentication unit has not succeed, and the information terminal including: an access unit configured to drive the wireless tag with the radio signal, and to access the wireless tag by the short-range wireless communication; an obtaining unit configured to obtain information stored in the wireless tag accessed by the access unit; and a transmission unit configured to transmit the sleep return command to the information processing apparatus on the basis of the information obtained by the obtaining unit.

According to still another aspect of the present invention, there is provided an information processing system comprising an information processing apparatus, a server, and an information terminal, the information processing apparatus including: a wireless tag configured to be supplied with power based on a radio signal transmitted from an information terminal; a power mode control unit configured to shift the information processing apparatus from a power-saving mode to a normal mode upon receipt of a sleep return command from the information terminal via the wireless tag by short-range wireless communication; a notification unit configured to notify the information terminal that the information processing apparatus is shifted to the normal mode by the power mode control unit, the server including: an authentication unit configured to perform authentication of a user upon receipt of authentication data of the user from the information terminal, and to transmit a result of the authentication to the information terminal, and the information terminal includes: an access unit configured to drive the wireless tag with the radio signal, and to access the wireless tag by short-range wireless communication; an obtaining unit configured to obtain information stored in the wireless tag accessed by the access unit; and a transmission unit configured to transmit the authentication data of the user to the server, and to transmit, if the authentication of the user by the authentication unit has succeeded, the sleep return command to the information processing apparatus on the basis of the information obtained by the obtaining unit.

According to yet another aspect of the present invention, there is provided a method for controlling an information processing apparatus including a wireless tag configured to be supplied with power based on a radio signal transmitted from an information terminal, the method comprising: a power mode controlling step of controlling the information processing apparatus to shift from a power-saving mode to a normal mode upon receipt of a sleep return command from the information terminal via the wireless tag; a notification step of notifying the information terminal that the information processing apparatus is shifted to the normal mode in the power mode controlling step; an authentication step of performing authentication of a user upon receipt of authentication data of the user from the information terminal after notification in the notification step; and a controlling step of starting an operation in the normal mode if the authentication of the user has succeeded in the authentication step, and controlling the information processing apparatus to shift to the power-saving mode if the authentication of the user has not succeed in the authentication step.

According to the present invention, simply by bringing an information terminal close to an information processing apparatus in a power-saving mode, it is possible to cause the information processing apparatus to return from the power-saving mode to a normal mode. A wireless tag consumes less power relative to a conventional power-saving mode, and thus has the effect of being able to reduce power consumption in the power-saving mode.

Further features of the present invention will become apparent from the following description of exemplary embodiments (with reference to the attached drawings).

BRIEF DESCRIPTION OF THE DRAWINGS

FIG. 9 is a flowchart illustrating sleep return processing performed using an RFID tag and a power mode control unit of the multi-function peripheral according to Embodiment 1.

FIG. 10 is a flowchart illustrating the authentication processing (step S805 in FIG. 8) performed in the multi-function peripheral according to Embodiment 1.

FIG. 11 illustrates a data format of an authentication database held in an HDD of the multi-function peripheral according to Embodiment 1.

FIGS. 12A and 12B illustrate an authentication database held in an HDD of a server according to Embodiment 4.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

Figure 1:
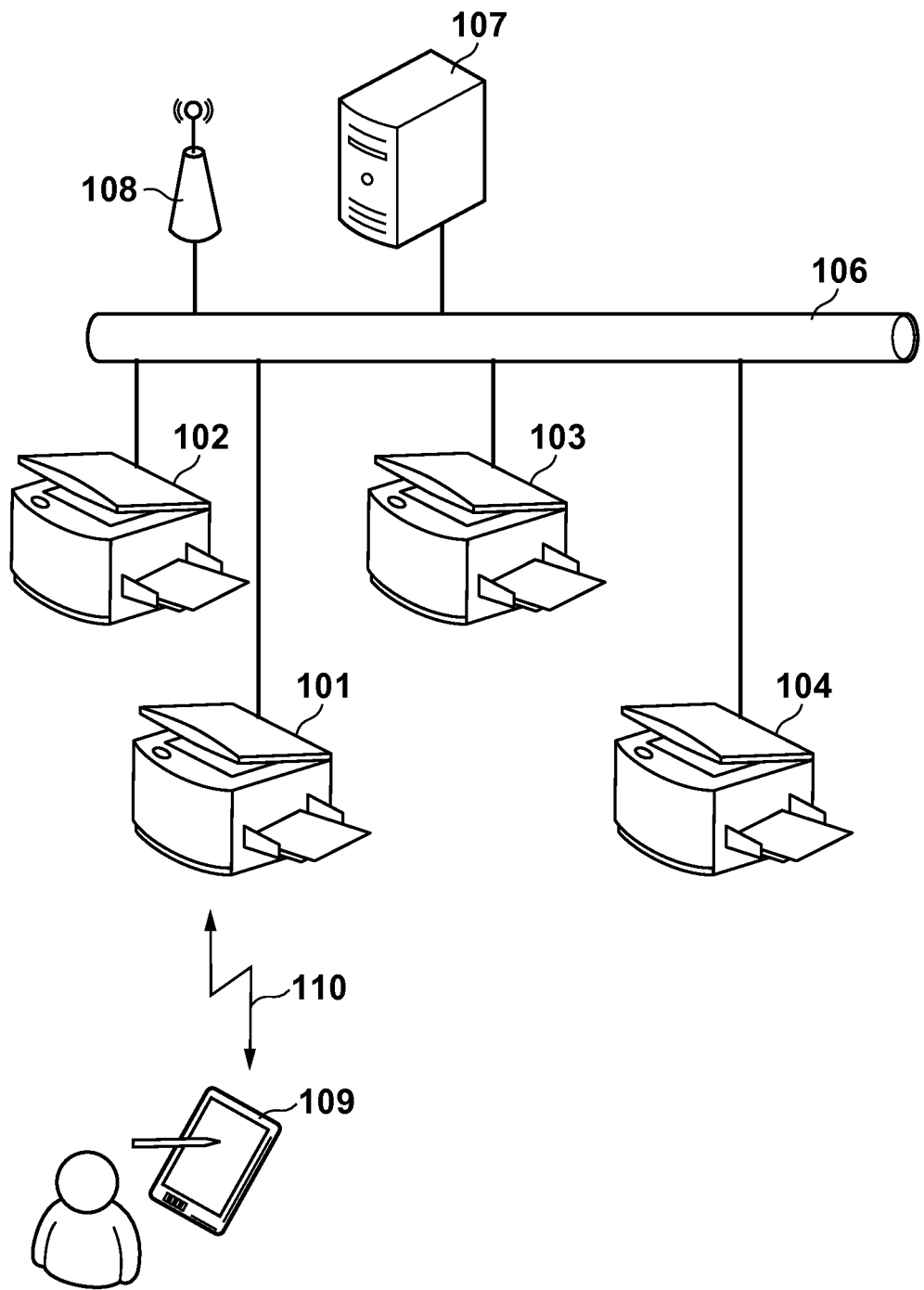
FIG. 1 illustrates a configuration of an information processing system according to embodiments of the present invention.

FIG. 1 illustrates a configuration of an information processing system according to the embodiments of the present invention.

This system includes multi-function peripherals 101, 102, 103 and 104, a server 107 and a wireless access point 108 that are connected to each other via a network 106, and an information terminal 109. The information terminal 109 is a tablet terminal such as a smartphone. Here, each device is assumed to be provided with an IP address for identifying the device via the network 106. Also, the information terminal 109 is provided with a short-range wireless communication function, and is capable of transmitting and receiving data to and from a nearby located multi-function peripheral provided with an RFID tag (wireless tag) via short-range wireless communication 110. Note that the configuration illustrated in FIG. 1 is only an example, and the number of the devices, connection topology, and the like are not limited to these.

Figure 2:
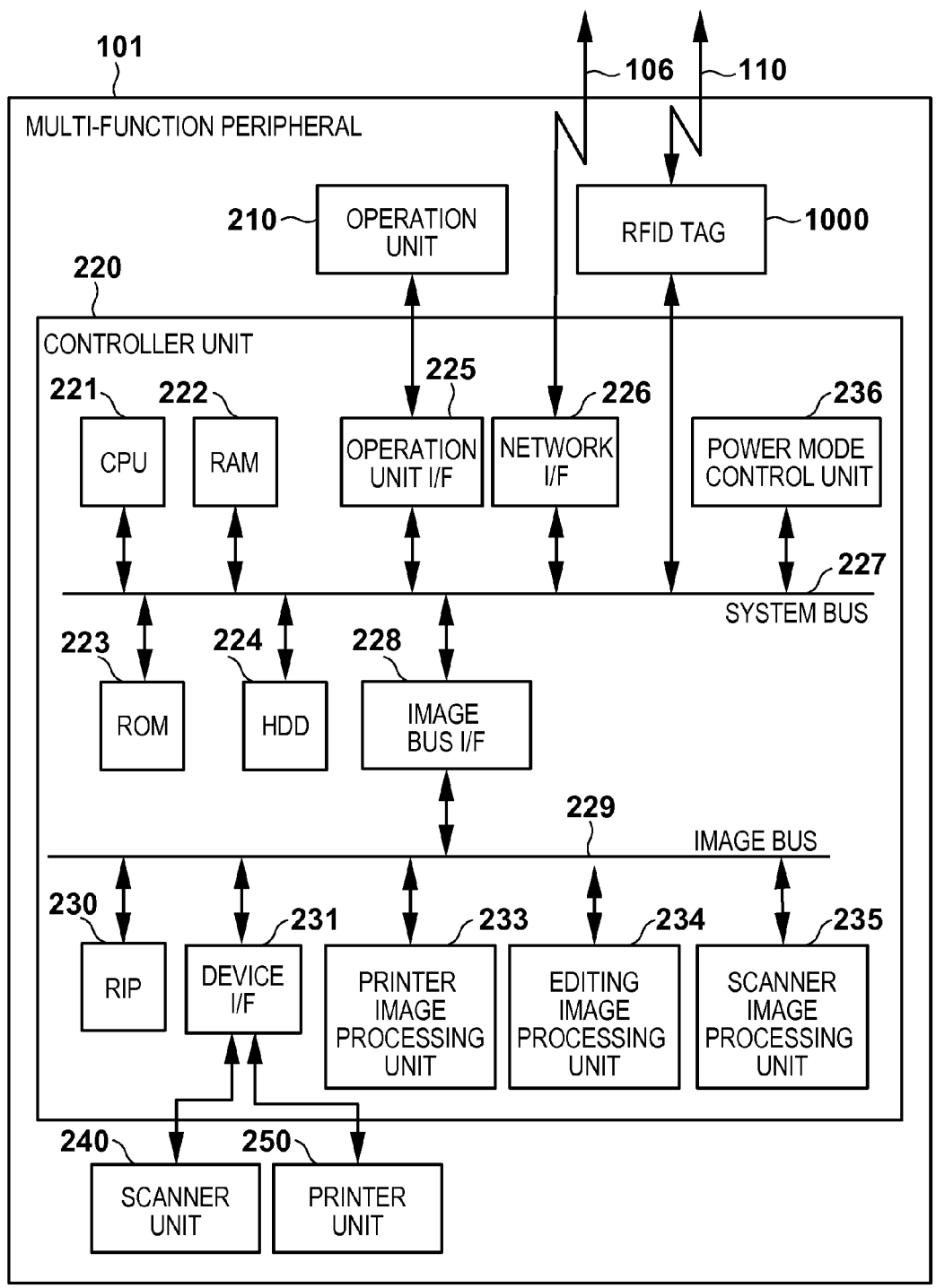
FIG. 2 is a block diagram illustrating a configuration of a multi-function peripheral according to the embodiments.

FIG. 2 is a block diagram illustrating a configuration of the multi-function peripheral 101 of the embodiments. Note that the other multi-function peripherals 102, 103, and 104 have similar configurations to the configuration of the multi-function peripheral 101, and therefore descriptions thereof are omitted.

An operation unit 210 includes a display unit provided with a touch panel, and a key operation unit, and is connected to a controller unit 220 to perform input of information from a user or display of, for example, a message to the user. The controller unit 220 is connected to a scanner unit 240 and a printer unit 250 via a device I/F 231, and is connected to the network 106 via a network I/F 226, thereby performing control of the devices and input/output of various types of information.

In the controller unit 220, a central processing unit (CPU) 221 performs overall control of operations of this multi-function peripheral 101. A RAM 222 provides a program area in which a program that is executed by the CPU 221 is loaded, a work memory for temporarily storing data for use in calculation, and the like. A ROM 223 has stored therein a boot program and reads, using this boot program, an OS or a program installed in a hard disk drive (HDD) 224 at the time of booting of the multi-function peripheral 101, and loads the read OS or program on the RAM 222. The HDD 224 further stores various types of settings relating to control of the multi-function peripheral 101, image data, document data, and the like. An operation unit I/F 225 controls an interface of the operation unit 210, and mediates data input by the operation unit 210, data to be output to the operation unit 210, and the like. The network I/F 226 controls input/output of information to/from another information device via the network 106. The network I/F 226 further includes an external output port for outputting a signal to a system bus 227 in accordance with the information received via the network 106.

A power mode control unit 236 controls power modes of this multi-function peripheral 101. These power modes include a normal mode, which is a normal state, and a power-saving mode (sleep) for suppressing power consumption by stopping power supply to components that do not need to operate to cause the components to stop operating. In the normal mode, power is supplied to all the above-described components, but in the power-saving mode, power is only supplied to the power mode control unit 236 and the network I/F 226. Note that the power-saving mode is not limited to this, and may have other aspects. For example, in the power-saving mode, power may be supplied to, in addition to the power mode control unit 236 and the network I/F 226, the controller unit 220. In the power-saving mode, it is sufficient that power supply to at least an RFID tag 1000 is stopped.

An image bus I/F 228 mediates between the system bus 227 and an image bus 229 that connects components assigned to perform image processing to each other, converts data structure, and the like. The image bus 229 has connected thereto a raster image processor (RIP) 230, the device I/F 231, a printer image processing unit 233, an editing image processing unit 234, and a scanner image processing unit 235.

The RIP 230 converts a page description language (PDL) code, a display list, and the like into a bitmap image. The device I/F 231 connects the scanner unit 240 and the printer unit 250 to the controller unit 220, and performs synchronous/asynchronous conversion of image data. The printer image processing unit 233 subjects image data to be output to the printer unit 250 to processing such as correction or resolution conversion depending on a printer engine of the printer unit 250. The editing image processing unit 234 performs various types of image processing such as rotation, compression, and decompression of image data. The scanner image processing unit 235 subjects image data input from the scanner unit 240 to various types of processing such as correction, manipulation, or editing.

Figure 3:
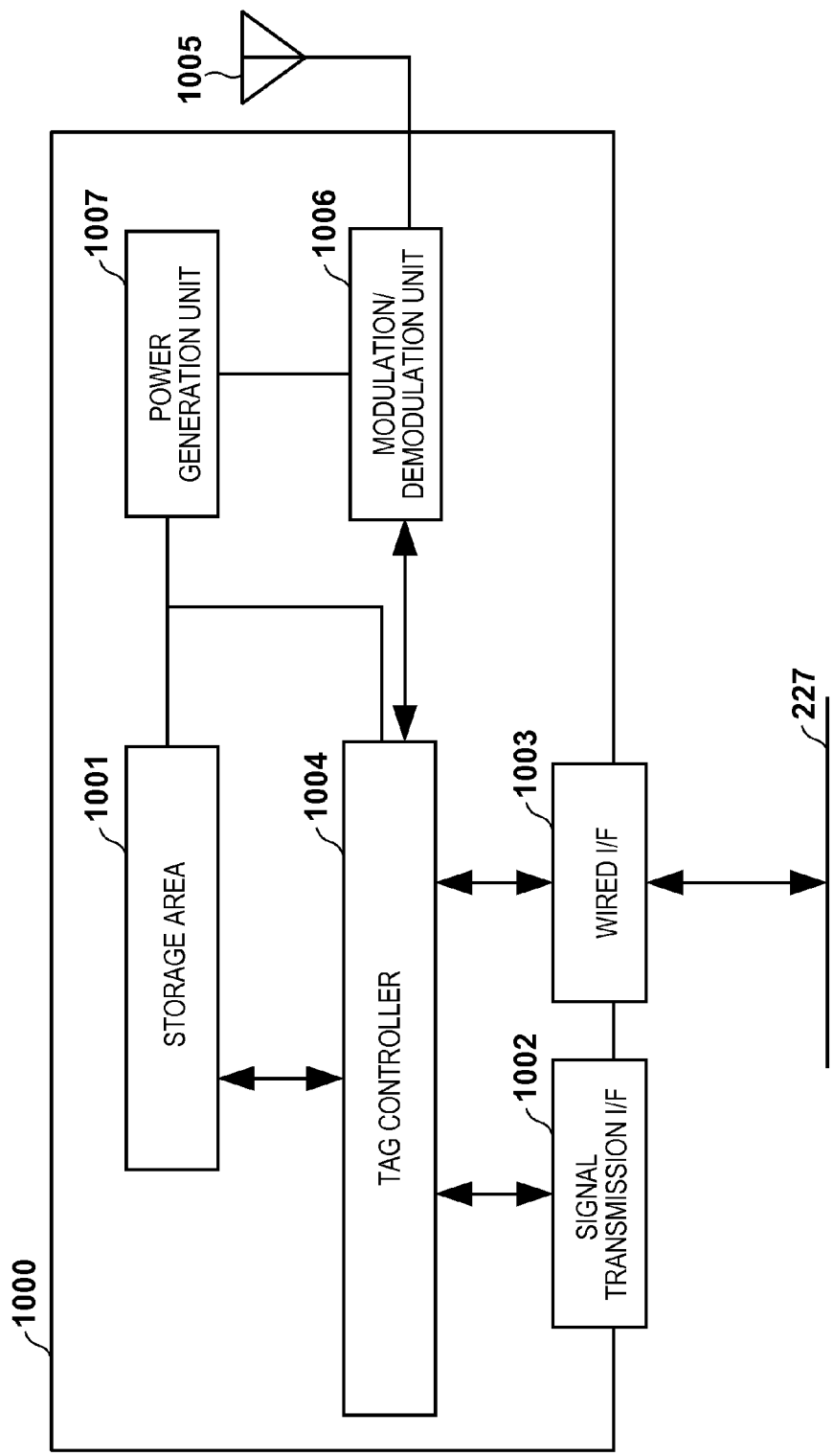
FIG. 3 is a block diagram illustrating a configuration of an RFID tag according to the embodiments.

The RFID tag 1000 is physically included in a housing of the multi-function peripheral 101 and connected to the controller unit 220 via a wired I/F 1003 (FIG. 3). The RFID tag 1000 starts the short-range wireless communication 110 when a tag reader/writer is brought close thereto from the outside. The RFID tag 1000 includes therein a storage area 1001 (FIG. 3), and is capable of transmitting and receiving data to and from an external device via the short-range wireless communication 110. In this case, the RFID tag 1000 operates by power supplied from the external device, so an amount of power consumption on the side of the multi-function peripheral 101 is "0".

FIG. 3 is a block diagram illustrating a configuration of the RFID tag 1000 of the embodiments.

This RFID tag 1000 is provided with the storage area 1001, a tag controller 1004, an antenna unit 1005, a modulation/demodulation unit 1006, a power generation unit 1007, a signal transmission I/F 1002, and the wired I/F 1003. The storage area 1001 holds data.

The antenna unit 1005 transmits/receives radio waves, and is combined with a resonant capacitor to constitute a resonance circuit. The power generation unit 1007 performs rectification and smoothing of supply voltage. The modulation/demodulation unit 1006 performs modulation and demodulation of radio signals. When a radio signal for supplying power is transmitted from an external device (in the embodiments, the information terminal 109), the antenna unit 1005 receives this radio signal by the above-mentioned resonance circuit and supplies a generated electric current to the power generation unit 1007. This enables the power generation unit 1007 to generate power that is necessary for operation of the RFID tag 1000, and to supply the generated power to each component of the RFID tag 1000. This power is supplied to the storage area 1001, the modulation/demodulation unit 1006, and the tag controller 1004. The tag controller 1004 controls the RFID tag 1000.

Data to be read from the RFID tag 1000 or to be written in the RFID tag 1000 is transmitted and received together with the radio signal for supplying power from the external device. The radio signal transmitted to the RFID tag 1000 is demodulated by the modulation/demodulation unit 1006, and data included in this radio signal is stored in the storage area 1001 by the tag controller 1004. Also, data read from the storage area 1001 by the tag controller 1004 is modulated by the modulation/demodulation unit 1006 and transmitted from the antenna unit 1005 as a radio signal.

The wired I/F 1003 is an interface for exchanging data input/output requests or data itself from the system bus 227 to the RFID tag 1000. The signal transmission I/F 1002 is an interface for outputting a control signal from the tag controller 1004 to the outside. The tag controller 1004 outputs a signal via the signal transmission I/F 1002 in response to an access via the specific short-range wireless communication 110. Specifically, the tag controller 1004 outputs a pulse signal when a specific region of the storage area 1001 is filled with specific values. Note that output of signals to an external device via the signal transmission I/F 1002, access to data in the storage area 1001, and the like can be performed only by power supplied by the power generation unit 1007 upon receipt of a radio signal.

Figure 4:
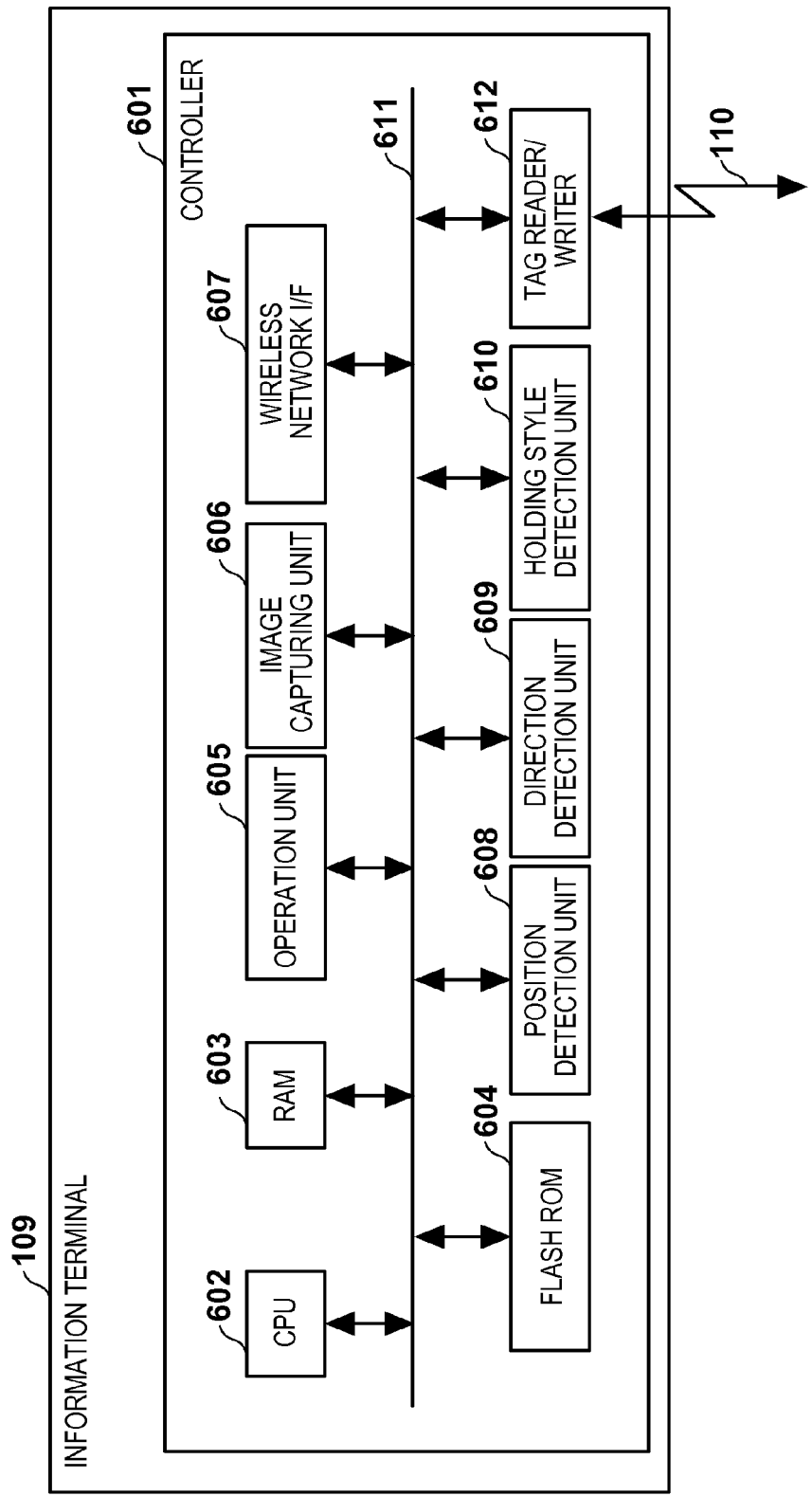
FIG. 4 is a block diagram illustrating a configuration of an information terminal according to the embodiments.

FIG. 4 is a block diagram illustrating a configuration of the information terminal 109 of the embodiments.

The information terminal 109 includes a controller 601. In this controller 601, a CPU 602 performs overall control of this information terminal 109. A RAM 603 provides a work memory for temporarily storing data for use in calculation by the CPU 602. A flash ROM 604 stores programs that are executed by the CPU 602 and various types of data. An operation unit 605 performs input/output of information between a user and the information terminal 109. An image capturing unit 606 captures images using a camera. A wireless network I/F 607 is an interface for communicating with the network 106 via the wireless access point 108. A position detection unit 608 specifies the present location of the information terminal 109 using a GPS receiver or the like. A direction detection unit 609 detects a direction in which the information terminal 109 is directed at that time using a geomagnetic sensor or the like. A holding style detection unit 610 detects, using an acceleration sensor or the like, whether the user is holding the information terminal 109 vertically or laterally. A tag reader/writer 612 detects the RFID tag 1000. If the RFID tag 1000 is detected, the tag reader/writer 612 drives the RFID tag 1000 to start the short-range wireless communication 110 and accesses data of the RFID tag 1000. Also, the tag reader/writer 612 transmits a radio signal for supplying power as described in FIG. 3. With this radio signal, power is generated in the multi-function peripheral 101. These components are connected to each other via a system bus 611.

Figure 5:
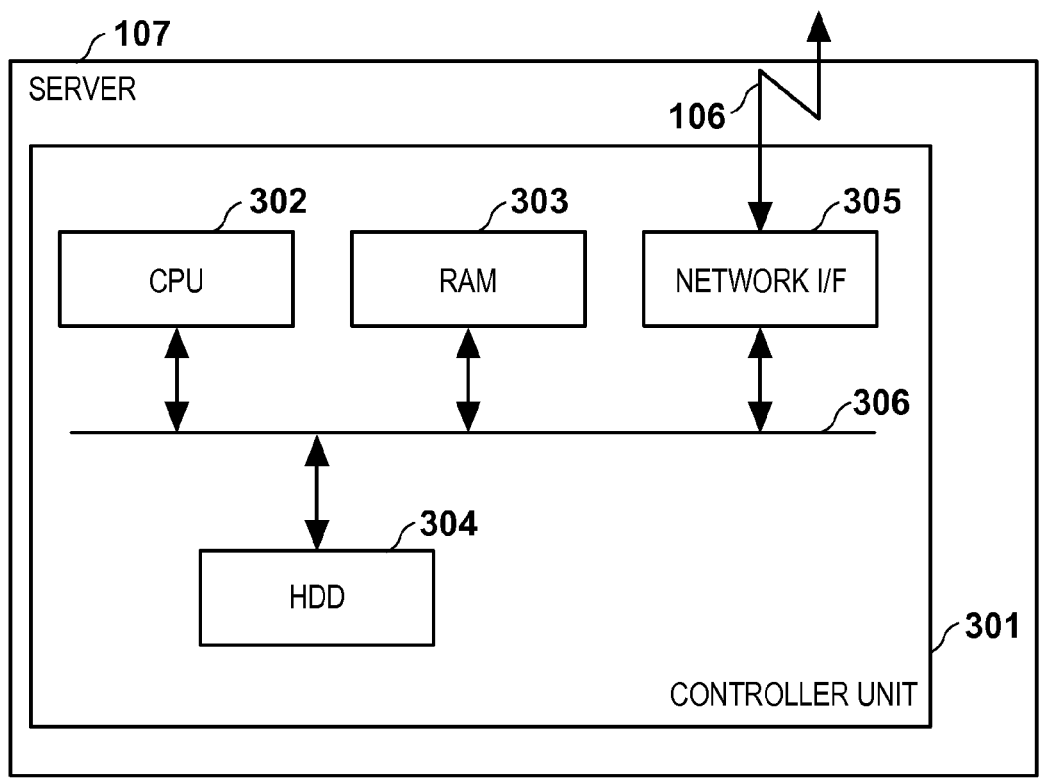
FIG. 5 is a block diagram illustrating a configuration of a server according to the embodiments.

FIG. 5 is a block diagram illustrating a configuration of the server 107 of the embodiments.

A server 107 is provided with a controller unit 301. In the controller unit 301, a CPU 302 performs overall control of this server 107. A RAM 303 provides a work memory for temporarily storing data for use in calculation by the CPU 302. The HDD 304 stores a program used by the server 107 and various types of data. A network I/F 305 is an interface with the network 106, and performs input/output of information to/from another information device via the network 106. These components are connected to each other via a system bus 306.

Figure 6:
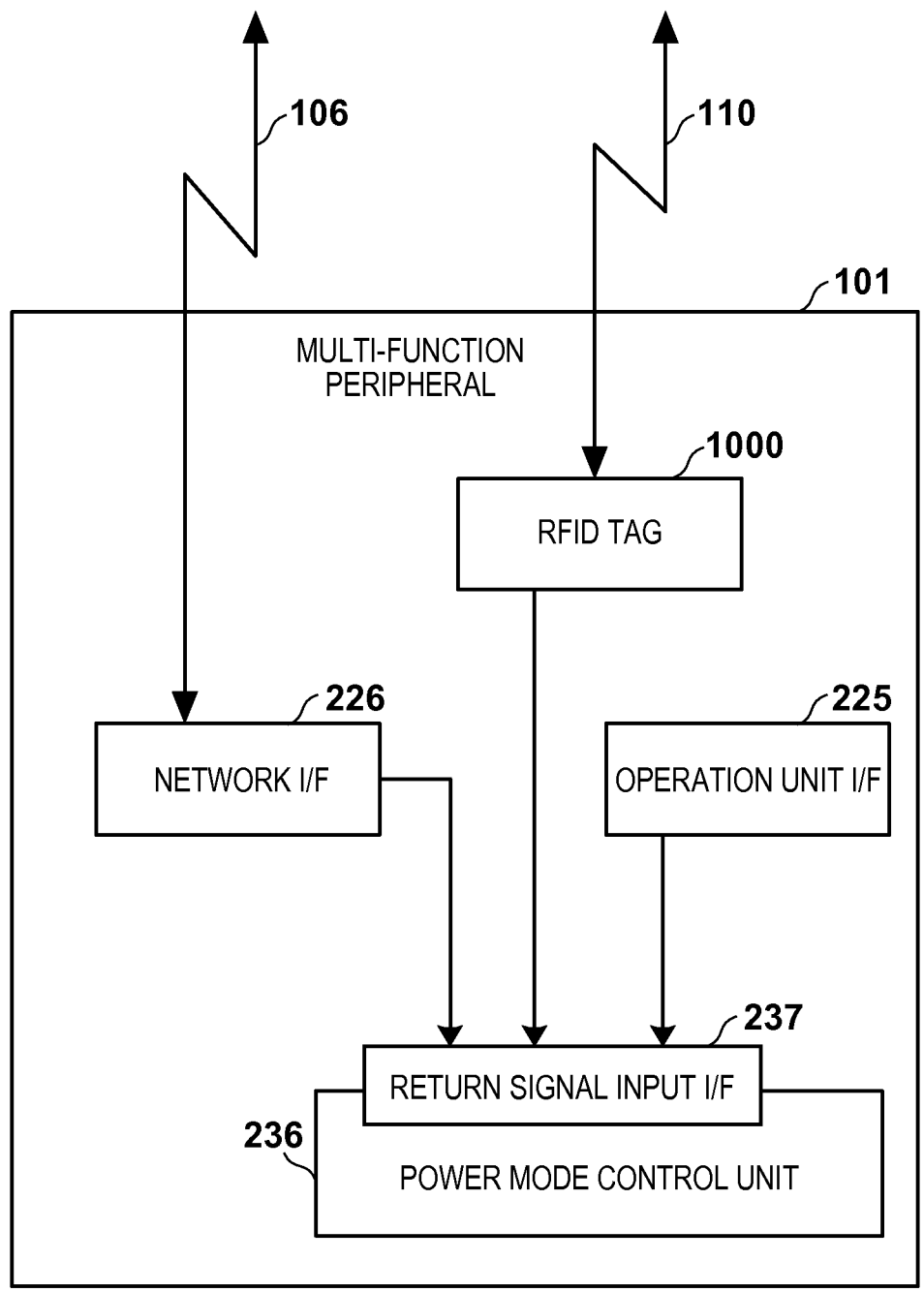
FIG. 6 is a block diagram illustrating a configuration in which a power mode control unit according to the embodiments inputs a return signal for causing a multi-function peripheral to return from a power-saving mode (sleep state) to a normal mode.

FIG. 6 is a block diagram illustrating a configuration in which the power mode control unit 236 of the embodiments inputs a return signal for causing the multi-function peripheral 101 to return from the power-saving mode (sleep state) to the normal mode.

Here, connection relations of the operation unit I/F 225, the RFID tag 1000, and the network I/F 226 to the power mode control unit 236 are shown. Note that in FIG. 6, connection relations of the components to the system bus 227 are omitted. The RFID tag 1000 is connected to the power mode control unit 236 via the signal transmission I/F 1002 (FIG. 3). A signal line from the signal transmission I/F 1002 is connected to a return signal input I/F 237 of the power mode control unit 236. Also, the network I/F 226 is connected to the return signal input I/F 237 of the power mode control unit 236 via the external output port. Similarly, part of a wiring passing through the operation unit I/F 225 is connected to the return signal input I/F 237 of the power mode control unit 236. Specifically, a wiring connected to a button that is used by a user for causing the multi-function peripheral 101 to return from the sleep state to the normal mode is connected to the return signal input I/F 237 of the power mode control unit 236.

The return signal input I/F 237 is a port for inputting return instruction signals, and is capable of inputting a plurality of signals. The power mode control unit 236 can change the power mode of the multi-function peripheral 101, depending on a power mode control instruction from the CPU 221, reception of a specific power mode control signal via the network I/F 226, and an input signal from the return signal input I/F 237.

The following will describe sleep return processing in which the information terminal 109 causes the multi-function peripheral 101 to return from the sleep state to the normal mode. The sleep return processing refers to processing in which the power mode returns from the power-saving mode to a normal mode.

Embodiment 1

Figure 7:
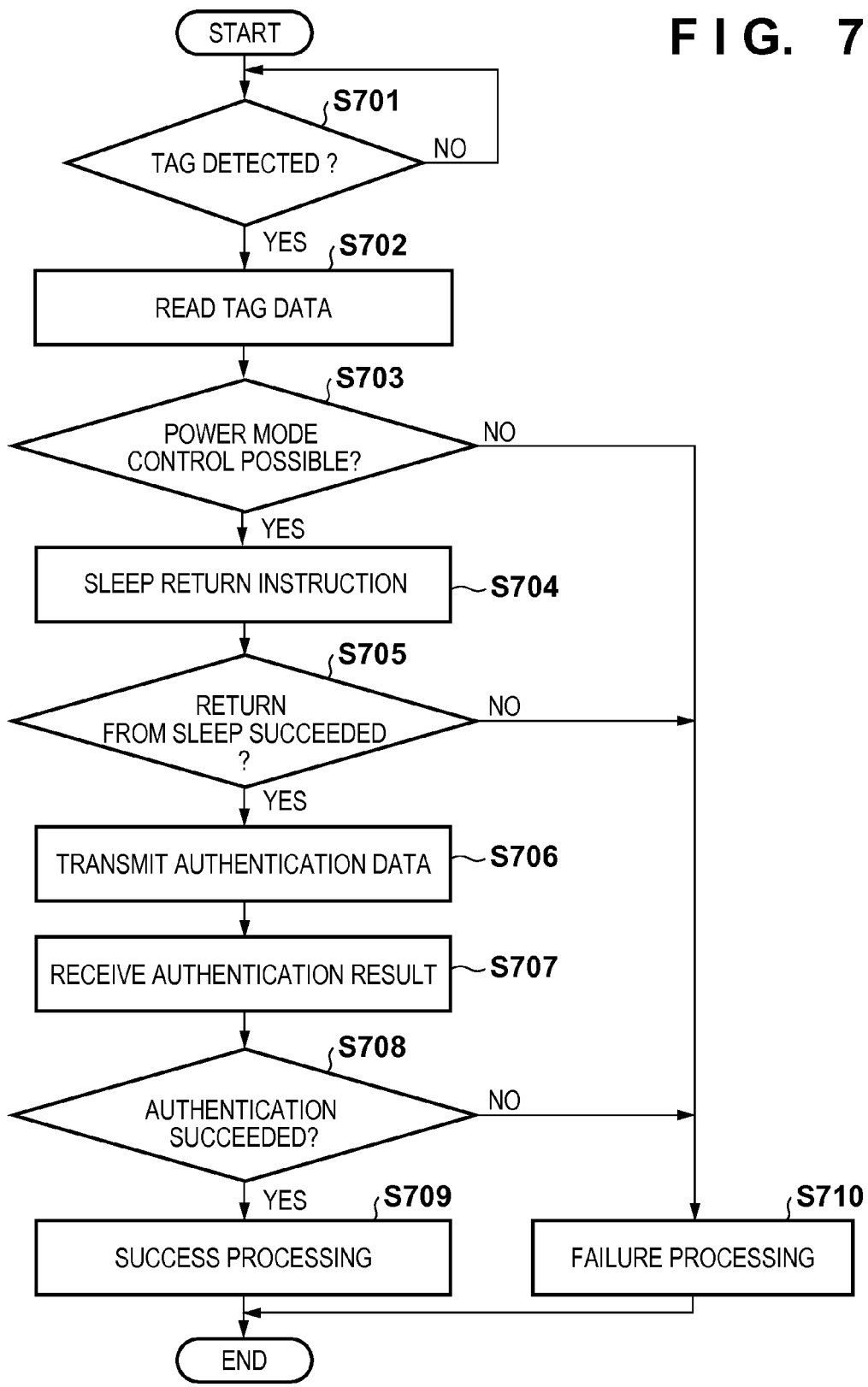
FIG. 7 is a flowchart illustrating processing in which an information terminal according to Embodiment 1 gives a sleep return instruction and an authentication instruction to a multi-function peripheral.

FIG. 7 is a flowchart illustrating processing in which the information terminal 109 of the Embodiment 1 gives a sleep return instruction and an authentication instruction to the multi-function peripheral 101. Note that a program for executing this processing is stored in the flash ROM 604, and the processing shown by this flowchart is executed by the CPU 602 executing this program.

First, in step S701, the CPU 602 of the information terminal 109 determines whether or not the tag reader/writer 612 has detected the RFID tag 1000. If the RFID tag 1000 was detected, the processing advances to step S702, and the CPU 602 causes the tag reader/writer 612 to read tag data held in the detected RFID tag 1000, and stores the read tag data in the RAM 603. A data format of this tag data includes a network address description section in which a network address of the multi-function peripheral 101 is described, a command description section in which a command for instructing the other communication party is described, and a multi-function peripheral information description section in which basic function information of the multi-function peripheral is described. In particular, the basic function information includes information as to whether or not a sleep return instruction can be received via the RFID tag 1000. Here, it is assumed that the multi-function peripheral 101 is in the power-saving mode, and that the RFID tag 1000 is not being supplied with power.

Next, the processing advances to step S703, and the CPU 602 analyzes the tag data stored in the RAM 603, and determines whether or not the detected RFID tag 1000 is a tag provided in the multi-function peripheral 101 whose power mode can be controlled. Specifically, the tag data is interpreted based on a predetermined format, and it is checked, based on the basic function information of the multi-function peripheral, whether or not this multi-function peripheral can receive the sleep return instruction via the RFID tag. If the CPU 602 determines that the sleep return instruction can be received, the processing advances to step S704, but if it is determined that the sleep return instruction cannot be received or if the interpretation of the tag data fails, the processing advances to step S710. Here, the failure of the interpretation of the tag data refers to the case, for example, where unexpected data is stored in the tag data. This may occur when a tag such as a traffic IC card or a driver's license that does not belong to the MFP is read.

In step S704, the CPU 602 causes the tag reader/writer 612 to transmit a sleep return command to the RFID tag 1000. Specifically, a command in the command description section of the tag data obtained in step S702 is rewritten into the return command and transmitted. Note that the tag reader/writer 612 of the information terminal 109 transmits, in step S704, a radio signal for supplying power as described in FIG. 3. With this radio signal, power is generated in the multi-function peripheral 101, and the generated power is supplied to the RFID tag 1000.

Upon receipt of the command transmitted in step S704, the multi-function peripheral 101 starts sleep return processing that will be described later with reference to FIG. 9.

Next, the processing advances to step S705, and the CPU 602 determines whether or not the multi-function peripheral 101 has succeeded to return from the sleep state. Specifically, the CPU 602 waits for a sleep return reply command from the multi-function peripheral 101 via the network I/F 226 in response to the return command. This command is transmitted from the multi-function peripheral 101 in the later-described step S803 in FIG. 8. Note that here it can be determined whether or not this reply command is transmitted from the target multi-function peripheral, depending on whether or not the network address of the multi-function peripheral 101 obtained in step S702 matches a sleep return reply command source. If a sleep return reply command is transmitted from the target multi-function peripheral within a predetermined period of time, it is determined that return from the sleep state has succeeded and the processing shifts from step S705 to step S706. Otherwise, it is determined that return from the sleep state has failed and the processing shifts from step S705 to step S710.

In step S706, the CPU 602 makes an authentication request to the multi-function peripheral 101 via the wireless network I/F 607. This authentication request transmits a user ID and a password to the multi-function peripheral 101, and requests the multi-function peripheral 101 to send back a determination result of whether or not authentication succeeded. A user ID and a password that have been input in advance to the information terminal 109 by the user are transmitted. Then, the processing advances to step S707, and the CPU 602 receives the authentication result from the multi-function peripheral 101 via the wireless network I/F 607, and stores the received authentication result in the RAM 603. Then, in step S708, the CPU 602 determines whether or not the authentication result received in step S707 is "succeeded". If the authentication result is "succeeded", the processing then advances to step S709, and if the authentication result is "failed", the processing then advances to step S710. In step S709, the CPU 602 outputs, to the operation unit 605, the result that return from sleep and authentication succeeded, and displays a setting screen adapted to functions available in the multi-function peripheral 101 that performed authentication. On the other hand, in step S710, the CPU 602 outputs, to the operation unit 605, the result received in step S707 that return from sleep and authentication failed.

As described above, according to the present embodiment, simply by bringing the information terminal 109 close to the multi-function peripheral 101, it is possible to cause the multi-function peripheral 101 to return from a power-saving mode (sleep state) to a normal mode.

FIG. 9 is a flowchart illustrating sleep return processing performed by the RFID tag 1000 and the power mode control unit 236 of the multi-function peripheral 101 of Embodiment 1.

This processing starts when the RFID tag 1000 is activated by the information terminal 109 being brought close thereto. At this time, the multi-function peripheral 101 receives the radio signal transmitted by the tag reader/writer 612 in step S704 in FIG. 7 and power generated by the radio signal is supplied to the RFID tag 1000. First, in step S901, the tag controller 1004 of the RFID tag 1000 reads the command description section of the tag data, and receives a command from the information terminal 109. If the command is a sleep return command, a return signal is transmitted to the power mode control unit 236. Next, the processing advances to step S902, and the power mode control unit 236 is triggered by input from the return signal input I/F 237 to start to supply power to all the components of the controller unit 220. Accordingly, the multi-function peripheral 101 is caused to return from the power-saving mode to the normal mode. Next, the processing advances to step S903, and the power mode control unit 236 stores a return factor in the storage area of the power mode control unit 236. This is performed by identifying from which signal line the return signal is input in the return signal input I/F 237. Here, the return signal is input from a wiring connected to the RFID tag 1000, so a return factor by the RFID tag is stored in step S903.

Figure 8:
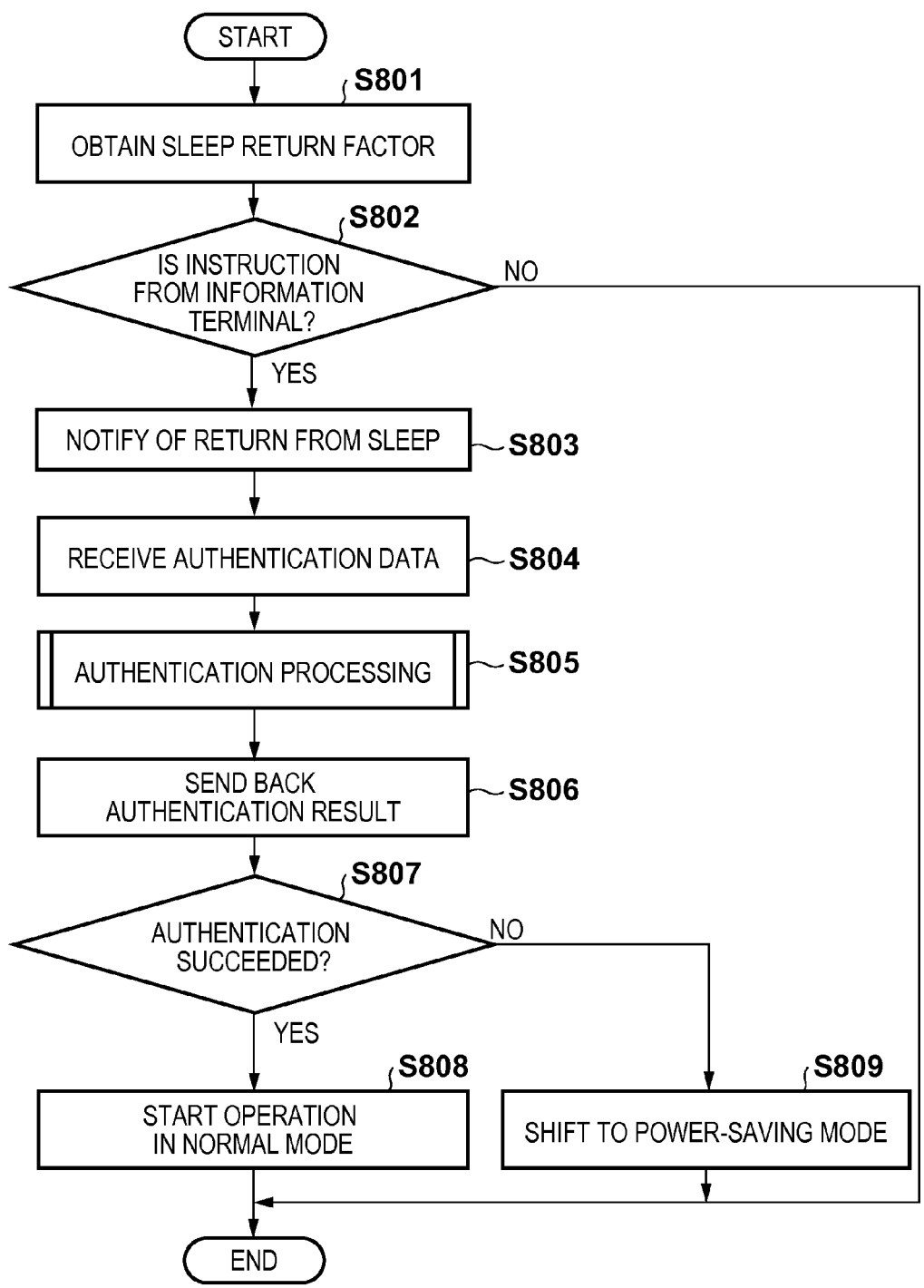
FIG. 8 is a flowchart illustrating sleep return processing and authentication processing performed in the multi-function peripheral according to Embodiment 1.

FIG. 8 is a flowchart illustrating sleep return processing and authentication processing performed by the multi-function peripheral of Embodiment 1. Note that the processing shown in the flowchart is executed by a program for executing the processing being loaded on the RAM 222 at the time of execution, and executed by the CPU 221. This flowchart starts immediately after the sleep return processing illustrated in FIG. 9 ends.

First, in step S801, the CPU 221 makes an inquiry to the power mode control unit 236, obtains a return factor from the sleep state, and stores the acquired return factor in the RAM 222. Next, the processing advances to step S802, and the CPU 221 obtains the return factor stored in the RAM 222. If this return factor is a return factor by the RFID tag 1000, it is determined that the instruction is from the information terminal 109, and the processing advances to step S803, but otherwise, the processing ends. In step S803, the CPU 221 notifies the information terminal 109 by performing multicast transmission of the sleep return reply command via the network I/F 226. This information is received in step S705 in FIG. 7 by the information terminal 109 via the access point 108.

Next, the processing advances to step S804, and the CPU 221 receives the authentication data transmitted by the information terminal 109 in step S706 in FIG. 7, and stores the received authentication data in the RAM 222. This authentication data includes the user ID and the password. The information is used in the later-described authentication processing. Next, the processing advances to step S805, and the CPU 221 performs authentication in accordance with a later-described flowchart of FIG. 10.

Then, the processing advances to step S806, and the CPU 221 sends back a result of this authentication to the information terminal 109, which is an authentication request source. Then, the processing advances to step S807, and the CPU 221 determines whether or not the authentication has succeeded. If the authentication result is "succeeded", the processing advances to step S808, and if the authentication result is "failed", the processing advances to step S809. In step S808, the CPU 221 displays completion of return from sleep on the operation unit 210, and starts launching various types of applications of the multi-function peripheral 101. On the other hand, in step S809, the CPU 221 instructs the power mode control unit 236 via the system bus 227 to shift to the power-saving mode, so as to cause the multi-function peripheral 101 to shift to the power-saving mode.

In this manner, the information terminal 109 is brought close to the multi-function peripheral 101, and if authentication of a user of the information terminal 109 is successful, it is possible to cause the multi-function peripheral 101 to return from the power-saving mode (sleep state) to the normal mode. In contrast, if authentication of the user of the information terminal 109 is not successful, the multi-function peripheral 101 is in the sleep state, thus enabling the power consumption of the multi-function peripheral 101 to be suppressed.

FIG. 11 illustrates a data format of an authentication database held in the HDD 224 of the multi-function peripheral 101 of Embodiment 1.

This authentication database is constituted by information on user IDs of users who can use the multi-function peripheral 101, and the passwords of these users. Based on this table, it is determined whether or not an authentication target user can use this multi-function peripheral 101. For example, in FIG. 12A, users who can use the multi-function peripheral 101 are the three users "AAA", "BBB", and "CCC". Note that although the passwords to be stored here are preferably subjected to hashing or the like in order to ensure security if needed, the passwords are shown here in plain text for the sake of simplicity.

FIG. 10 is a flowchart illustrating the authentication processing (step S805 in FIG. 8) performed in the multi-function peripheral 101 of Embodiment 1.

First, in step S1001, the CPU 221 reads, from the RAM 222, authentication information received from the information terminal 109. This authentication information includes a user ID and a corresponding password. Next, the processing advances to step S1002, and the CPU 221 reads, from the HDD 224, the authentication database described with reference to, for example, FIG. 11, and performs authentication of the user. Specifically, first, on the basis of the user name of the authentication information obtained in step S1001, it is checked whether or not there is the same user name in a user authentication table. If there is the same user name, the associated password in the user authentication table is compared with the password read in step S1001. If these passwords match each other, it can be confirmed that the user who performed the request is a registered user, and it is determined that the user authentication has succeeded. If the user authentication has succeeded, the CPU 221 advances the processing to step S1003, and if the user authentication has failed, the processing advances to step S1004. In step S1003, the CPU 221 stores an authentication result as "succeeded" in the RAM 222. On the other hand, in step S1004, the CPU 221 stores an authentication result as "failed" in the RAM 222.

Note that in Embodiment 1, the procedure in step S703 in FIG. 7 may be omitted. That is, when data of the RFID tag 1000 is read in step S702, the processing may then advance to step S704 to instruct to return from the sleep state.

As has been described above, according to Embodiment 1, simply by bringing the information terminal 109 provided with the RFID tag reader/writer close to a multi-function peripheral in the sleep state, it is possible to cause the multi-function peripheral to return from the sleep state to a normal mode. Here, since the RFID tag 1000 of the multi-function peripheral 101 consume no power when in standby, it is possible to reduce power that is conventionally consumed by the tag reader/writer in the sleep state.

Embodiment 2

In the above-described Embodiment 1, the procedures in steps S703 and S704 in FIG. 7 may be omitted. However, in this case, the RFID tag 1000 is configured to output a pulse signal from the signal transmission I/F 1002 immediately after power is supplied to the tag controller 1004. With this configuration, the sleep return processing in FIG. 9 will start at the same time when the tag is detected in step S701.

Embodiment 2 can be realized with less/fewer processing steps relative to Embodiment 1. Also, since the RFID tag 1000 of the multi-function peripheral 101 needs only to detect whether or not power is supplied, the RFID tag 1000 can be realized with a configuration with less/fewer circuits.

Embodiment 3

In the above-described Embodiment 1, the sleep return instruction in step S704 is performed by the tag reader/writer 612 of the information terminal 109, and the RFID tag 1000 via the short-range wireless communication 110.

However, this may be realized via the network 106. In this case, in step S704, the CPU 602 of the information terminal 109 transmits a sleep return packet to a network address of the multi-function peripheral 101 obtained in step S702, via the wireless network I/F 607.

Meanwhile, in Embodiment 3, the flow of the sleep return processing in FIG. 9 is executed when the network I/F 226 receives a packet from an external device.

Then, in step S901, upon receipt of a predetermined sleep return packet, the network I/F 226 of the multi-function peripheral 101 transmits a return signal to the power mode control unit 236 via the external output port. Steps S902 and S903 are equivalent to those in Embodiment 1. However, in Embodiment 3, a return factor that is stored in step S903 is "via the network". Accordingly, in step S802 in FIG. 8, if the return factor is "via the network", the processing will advance to step S803, and otherwise, the processing will end. The other procedures are the same as those in Embodiment 1, and therefore descriptions thereof are omitted.

According to Embodiment 3, in the RFID tag 1000, the wired I/F 1003 for transmitting a return signal to the power mode control unit 236, and a wiring for the transmission are not necessary. However, it is also possible to allow both return via a network as in Embodiment 3 and return via an RFID tag as in Embodiment 1, by retaining a configuration for returning via the RFID tag 1000.

According to this Embodiment 3, the configuration for returning via an RFID tag is not necessary, so it is possible to realize return from sleep by the short-range wireless communication 110 with a simplifier configuration. Therefore, the same effect as that of Embodiment 1 can be achieved with lower cost.

Embodiment 4

In Embodiment 4, a method for effectively controlling a power mode with the use of data described in the RFID tag 1000 will be described. Specifically, a configuration will be described in which return from sleep is performed only when the RFID tag 1000 is accessed by an authorized user. The server 107 is used for this purpose.

In Embodiment 4, data stored in the storage area 1001 of the RFID tag 1000 includes, in addition to the above-described data in Embodiment 1, a device ID that indicates a device number for individually identifying the multi-function peripheral 101. Note that the system configuration according to Embodiment 4, and the configurations of the multi-function peripheral, the information terminal, the server, and the like are the same as those of the above-described embodiments, and descriptions thereof are omitted.

FIGS. 12A and 12B illustrate an authentication database held in the HDD 304 of the server 107 of Embodiment 4.

This authentication database includes a device-user correspondence table (FIG. 12A) that indicates device IDs and user IDs of users who can use the corresponding device, and a user authentication table (FIG. 12B) that contains individual user IDs and passwords corresponding thereto. Using these tables, it is possible to perform user authentication and identification of a multi-function peripheral that is available to the user. For example, the first three rows from the top of the device-user correspondence table of FIG. 12A show that the multi-function peripheral having a device ID "xxx" can be used by the three users "AAA", "BBB", and "CCC". Also, it is possible to check whether or not the user is a registered user, depending on whether or not a pair of a user ID and a password of the user is included in the user authentication table.

Figure 13:
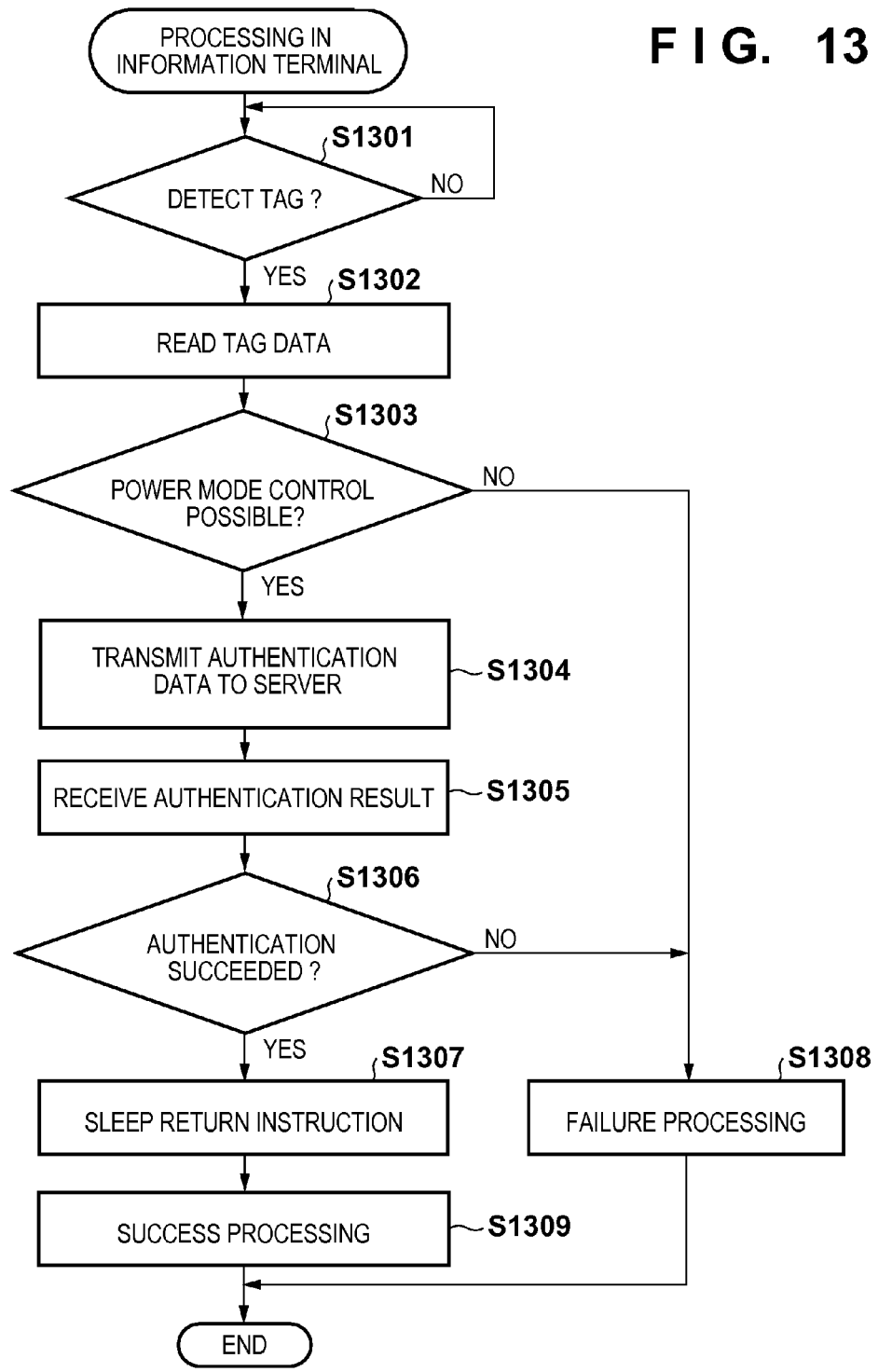
FIG. 13 is a flowchart illustrating processing in which an information terminal according to Embodiment 4 gives a sleep return instruction.

FIG. 13 is a flowchart illustrating processing in which the information terminal 109 of Embodiment 4 performs a sleep return instruction. Since respective steps S1301 to S1303 are the same as the steps S701 to S703 in FIG. 7, descriptions thereof are omitted. Note that a program for executing this processing is stored in the flash ROM 604, and the processing shown in this flowchart is executed by the CPU 602 executing this program.

In step S1304, the CPU 602 makes an authentication request to the server 107 via the wireless network I/F 607. Specifically, a device ID of the multi-function peripheral 101 included in the tag data obtained in step S1302, and a user ID and a password input in advance by the user are transmitted to the server 107. This data is received by the server 107 in step S1401 in FIG. 14. Next, the processing advances to step S1305, and the CPU 602 receives an authentication result from the server 107. This data is transmitted from the server 107 in step S1406 in FIG. 14. Then, the processing advances to step S1306, and the CPU 602 determines whether or not the authentication result received in step S1305 is "succeeded". If the authentication result is "succeeded", the processing advances to step S1307, and if the authentication result is "failed", the processing advances to step S1308. In step S1307, the CPU 602 transmits a sleep return instruction to the multi-function peripheral 101 in a similar manner to that in Embodiment 1 or 3. On the basis of this instruction, the multi-function peripheral 101 starts returning from the sleep state. The processing of the multi-function peripheral 101 that has received this sleep return instruction is equivalent to that in the above-described Embodiments 1 and 3, and therefore description thereof is omitted. However, since in Embodiment 4, authentication is performed by the server 107, authentication processing performed by the multi-function peripheral in the flowchart in FIG. 8 is not necessary. Then, the processing advances to step S1309, and the CPU 602 outputs, to the operation unit 605, the result of return from sleep and authentication having succeeded, and displays a setting screen adapted to functions available in the multi-function peripheral 101 that performed authentication. On the other hand, in step S1308, the CPU 602 displays, on the operation unit 605, the result that sleep return of the multi-function peripheral 101 failed.

Figure 14:
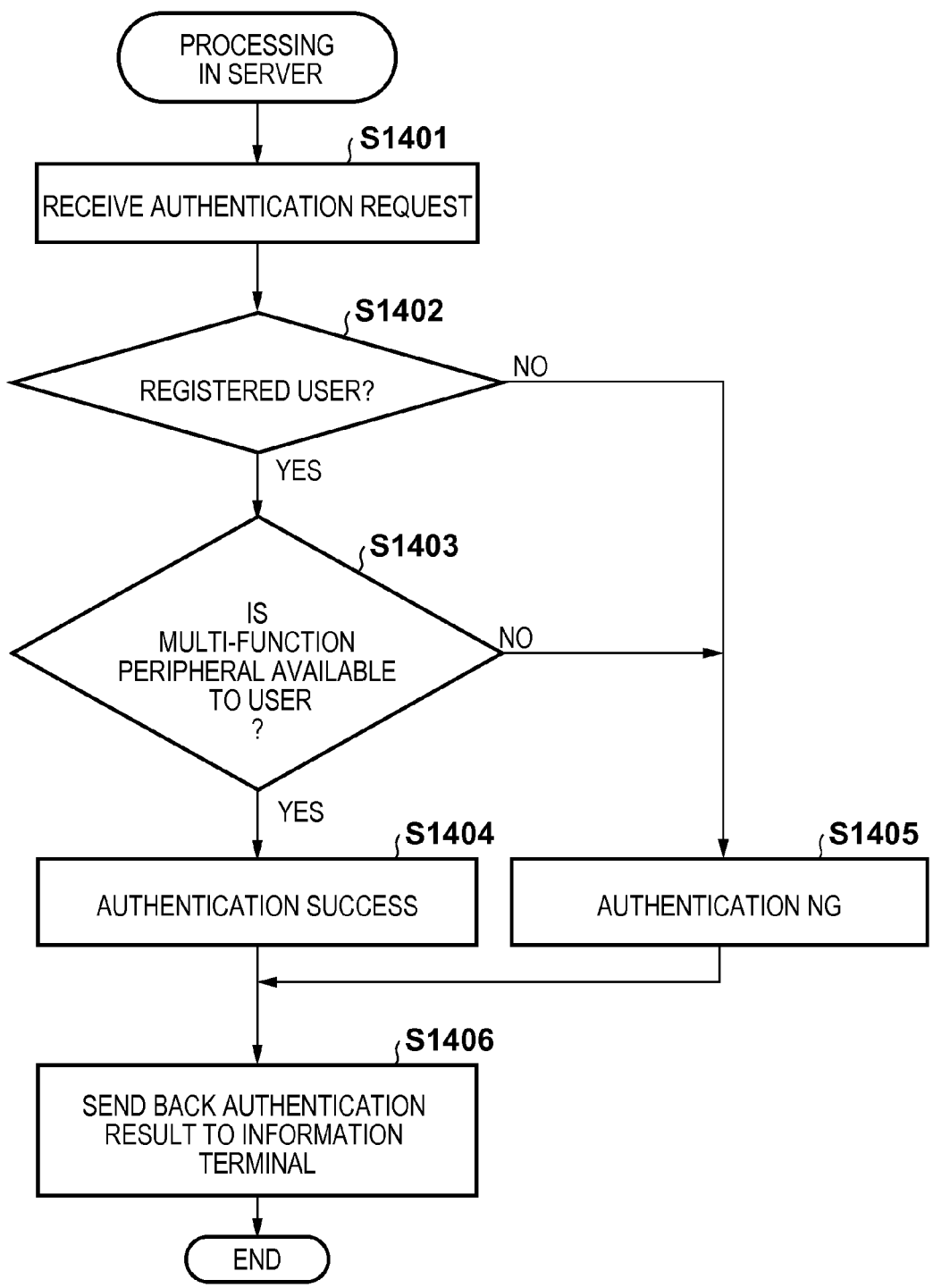
FIG. 14 is a flowchart illustrating authentication processing of the server according to Embodiment 4.

FIG. 14 is a flowchart illustrating the authentication processing by the server 107 of Embodiment 4. Note that the processing shown in this flowchart is executed by a program for executing this processing being loaded on the RAM 303 at the time of execution, and executed by the CPU 302.

First, in step S1401, the CPU 302 receives authentication data from the information terminal 109 via the network I/F 305, and stores the received authentication data in the RAM 303. The authentication data includes a user ID and a password, as well as an above-described device ID. This information is used in the later-described authentication processing. The authentication data is transmitted from the information terminal 109 in step S1304 in FIG. 13.

Next, the processing advances to step S1402, and the CPU 302 reads the authentication database (FIGS. 12A and 12B) from the HDD 304 to perform user authentication. Specifically, on the basis of the user ID of the received authentication data, the associated password in the user authentication table is compared with the password received in step S1401. If the passwords match each other, the user who performed the request is confirmed to be a registered user. If the user authentication has succeeded, the CPU 302 advances the processing to step S1403. On the other hand, if they do not match each other, the authentication is considered to have failed, and the processing advances to step S1405. In step S1403, the CPU 302 reads the authentication database (FIGS. 12A and 12B) from the HDD 304, and performs authentication of whether or not the user can use the multi-function peripheral 101. Specifically, it is checked whether or not a pair of the device ID and the user ID of the authentication data received in step S1401 is present in the device-user correspondence table. If the pair is present in the table, this multi-function peripheral 101 can be used by this user. That is, the user who performed the sleep return request is determined to have the right to use this multi-function peripheral 101, and the processing advances to step S1404. If the pair is not present, the processing advances to step S1405. In step S1404, the CPU 302 stores an authentication result as "succeeded" in the RAM 222. Otherwise, in step S1405, the CPU 302 stores an authentication result as "failed" in the RAM 222. Then, the processing advances to step S1406, and the CPU 302 sends back this authentication result to the information terminal 109, which is the authentication request source. This data will be received and used by the information terminal 109 in step S1305 in FIG. 13.

Note that the sleep return instruction in step S1307 in FIG. 13 may be performed by the server 107. In this case, the processing for transmitting the sleep return instruction to the information terminal 109 will be executed by the CPU 302 of the server 107 immediately before the step S1404 in FIG. 14.

As has been described above, according to Embodiment 4, using a result of authentication by a server, the information terminal 109 decides whether or not to give a sleep return instruction to the multi-function peripheral 101. At that time, since the server performs user authentication including whether or not use of the multi-function peripheral 101 is permitted, it is possible to prevent a user who is not permitted to use the multi-function peripheral 101 from performing a sleep return operation. Therefore, it is possible to achieve a further reduction in power consumption.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-146084, filed Jun. 28, 2012, which is hereby incorporated by reference herein in its entirety.

What is claimed is:

1. An information terminal comprising:
   a reading unit configured to read tag data from an RFID tag of a printing apparatus;
   a first transmission unit configured to transmit a return command to the printing apparatus based on address information included in the tag data, the return command instructing the printing apparatus to return from a power-saving mode to a normal power mode;
   a determination unit configured to, after the first transmission unit transmits the return command, determine whether the printing apparatus has succeeded or failed to return from the power-saving mode to the normal power mode;
   a notification unit configured to notify, in the case where the determination unit determines that the printing apparatus has failed to return from the power-saving mode to the normal power mode, a user that the printing apparatus has failed to return from the power-saving mode to the normal power mode; and a second transmission unit configured to transmit authentication data to the printing apparatus in a case where the determination unit determines that the printing apparatus has succeeded to return from the power-saving mode to the normal power mode, wherein the second transmission unit is configured to not transmit the authentication data to the printing apparatus in a case where the determination unit determines that the printing apparatus has failed to return from the power-saving mode to the normal power mode.

2. The information terminal according to claim 1, wherein the determination unit is configured to determine that the printing apparatus has succeeded to return from the power-saving mode to the normal power mode in a case where the information terminal receives a response command indicating that the printing apparatus has returned from the power-saving mode to the normal power mode, within a predetermined time period after transmission of the return command, and wherein the determination unit is configured to determine that the printing apparatus has failed to return from the power-saving mode to the normal power mode in a case where the information terminal does not receive the response command within the predetermined time period after transmission of the return command.

3. The information terminal according to claim 1, further comprising a notification unit configured to notify, in a case where authentication processing based on the authentication data has failed in the printing apparatus, a user that the authentication processing has failed.

4. The information terminal according to claim 1, wherein the authentication data includes a user ID and a password.

5. A method for controlling an information terminal, the method comprising:

transmitting, in a case where the information terminal reads tag data from an RFID tag of a printing apparatus, a return command to the printing apparatus based on address information included in the tag data, to return from a power-saving mode to a normal power mode;

determining, after the return command has been transmitted, whether the printing apparatus has succeeded or failed to return from the power-saving mode to the normal power mode;

notifying, in the case where the determination unit determines that the printing apparatus has failed to return from the power-saving mode to the normal power mode, a user that the printing apparatus has failed to return from the power-saving mode to the normal power mode; and transmitting authentication data to the printing apparatus in a case where it is determined that the printing apparatus has succeeded to return from the power-saving mode to the normal power mode, wherein the authentication data is not transmitted to the printing apparatus in a case where it is determined that the printing apparatus has failed to return from the power-saving mode to the normal power mode.

6. The method according to claim 5, wherein it is determined that the printing apparatus has succeeded to return from the power-saving mode to the normal power mode in a case where the information terminal receives a response command indicating that the printing apparatus has returned from the power-saving mode to the normal power mode, within a predetermined time period after transmission of the return command, and wherein it is determined that the printing apparatus has failed to return from the power-saving mode to the normal power mode in a case where the information terminal does not receive the response command within the predetermined time period after transmission of the return command.

7. The method according to claim 5, further comprising notifying, in a case where authentication processing based on the authentication data has failed in the printing apparatus, a user that the authentication processing has failed.

8. The method according to claim 5, wherein the authentication data includes a user ID and a password.

* * * * *